United States Patent
Tyler et al.

[11] Patent Number: 5,239,418
[45] Date of Patent: Aug. 24, 1993

[54] SINGLE SPLIT FRAME MODE FOR A FAST FRAME RECORDER

[75] Inventors: Edward Tyler, Encinitas; Todd Cooper, San Deigo, both of Calif.

[73] Assignee: Eastman Kodak Company, Rochester, N.Y.

[21] Appl. No.: 884,317

[22] Filed: May 11, 1992
(Under 37 CFR 1.47)

Related U.S. Application Data
[63] Continuation of Ser. No. 422,730, Oct. 17, 1989, abandoned.

[51] Int. Cl.$^5$ ............................................. H04N 5/78
[52] U.S. Cl. ................................... 360/10.3; 360/33.1; 358/183; 358/335; 358/213.28; 358/134
[58] Field of Search ...................... 360/10.3, 33.1, 9.1; 358/134, 137, 312, 335, 213.28, 213.31, 213.27, 183, 22

[56] References Cited
U.S. PATENT DOCUMENTS

| | | | |
|---|---|---|---|
| 4,322,752 | 3/1982 | Bixby | 358/213.27 |
| 4,339,775 | 7/1982 | Lemke et al. | 360/10.3 |
| 4,496,995 | 1/1985 | Colles et al. | 360/33.1 X |
| 4,511,931 | 4/1985 | Bixby | 360/10.3 |
| 4,789,894 | 12/1988 | Cooper | 358/335 X |

*Primary Examiner*—Andrew L. Sniezek
*Attorney, Agent, or Firm*—William F. Noval

[57] ABSTRACT

A fast frame recorder records a scene at a fast frame rate and displays it at a slower frame rate to produce a slow motion replay of the scene. The recorder includes a technique for recording a plurality of split frames of the scene during each frame period to effect an increased frame rate and for displaying the split frames of the scene on a video monitor either simultaneously or sequentially.

3 Claims, 7 Drawing Sheets

6X PARTIAL-FRAME MODE

FIG. 6

3X PARTIAL-FRAME MODE

FIG. 7

2X PARTIAL-FRAME MODE

SINGLE SPLIT FRAME MODE FOR A FAST FRAME RECORDER

This is a continuation of application Ser. No. 422,730, filed Oct. 17, 1989, now abandoned.

BACKGROUND OF THE INVENTION

In general, this invention relates to a fast frame recorder. More particularly, this invention relates to a fast frame recorder in which a plurality of split frames recorded during a whole frame period may be displayed either simultaneously or sequentially.

Fast frame recorders are used to effect motion analysis of fast moving phenomena in slow motion. This entails the recording of a great number of images during an event at high speed and then playback of the images slowly to analyze the event in step by step progression. Applications for motion analysis include malfunctions in high speed machinery, movements of an athlete, failure of safety equipment, trajectory analysis of a rapidly moving object such as a bullet, shattering of an object and physical reactions to a tire hitting a pot hole at high speed. The fast frame recorder (motion analyzer) disclosed in commonly assigned U.S. Pat. No. 4,789,894, issued Dec. 6, 1988, inventor Cooper, includes a video camera, a variable speed magnetic tape processor and a display monitor. The camera is capable of producing signals corresponding to selected frame rates of from about 30 to about 1000 frames per second. The video is read out from the imager in block format (i.e. a plurality of lines of video simultaneously) and is recorded in sequential blocks on a plurality of longitudinal tracks on tape. The magnetic tape processing system is capable of recording at high tape speeds and playing back at a predetermined slow speed to down convert the camera signals regardless of the camera frame rate to a nominal playback frame rate of 30 frames per second. The display monitor receives the playback signal at the reduced frame rate from the magnetic tape processing system and displays the scene in question in slow motion. This system is also capable of reading out and recording a plurality of partial frames during each whole frame. This results in a partial frame rate which is greater than the whole frame rate by a factor equal to the number of partial frames read out and recorded during each whole frame period. During playback the partial frames recorded during a whole frame period are displayed on the display monitor simultaneously. In certain applications, it has been found that a viewer of several partial frames simultaneously displayed on a monitor may become confused by the plurality of images displayed.

SUMMARY OF THE INVENTION

According to the present invention, there is provided a fast frame recorder which is capable of recording a plurality of partial frames during a whole frame period and of selectively playing back the partial frames either simultaneously or sequentially. By sequentially playing back each partial frame, the monitor display is simplified and confusion which may result from simultaneous display of a plurality of partial frames is minimized.

BRIEF DESCRIPTION OF THE DRAWINGS

In a detailed description of the preferred embodiments of the invention presented below reference is made to the accompanying drawings in which like numerals refer to like elements.

DESCRIPTION OF THE PREFERRED EMBODIMENT

The application in which the embodiments of the present invention will be described relates to a fast frame recorder which records scene information at a high frame rate and plays back such information at a slower frame rate, thereby allowing slow motion analysis of a moving object. The imager frame rate used for recording is variable between 30 and 1,000 frames per second, depending upon the desired speed reduction, while the display frame rate is constant at 30 frames per second. Accordingly, the apparent speed at which an object moves when viewed upon playback will be reduced by a factor equal to the ratio of the recording frame rate to the playback frame rate. The maximum speed reduction is therefore about 33 (i.e. 1,000 divided by 30). At this speed reduction, the exposure time for each frame is 1/1000 of a second which is short enough to provide high resolution images, with very little image smear of rapidly moving objects.

Figure 1:
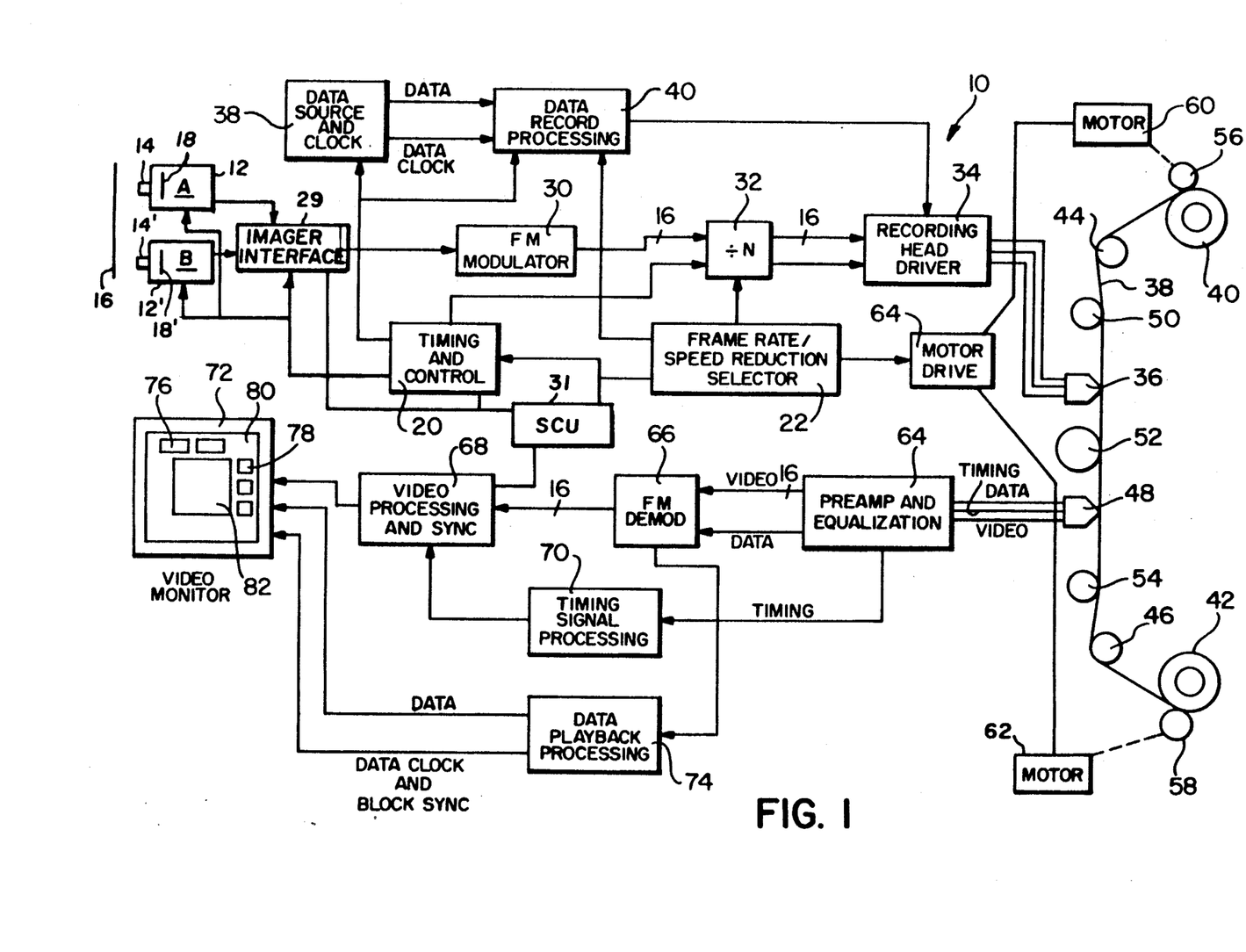
FIG. 1 is a functional block diagram of a fast frame recorder including an embodiment of the present invention.

Referring to FIG. 1, there is shown a functional block, schematic diagram showing a fast frame recorder including an embodiment of the present invention. The fast frame recorder 10 includes "A" and "B" imagers 12 and 12' having lenses 14 and 14' which image a scene 16 onto sensors 18 and 18'. Imagers 12 and 12' are controlled by timing circuit 20 which supplies suitable timing signals to imagers 12 and 12' as a function of the operator selectable frame rate and speed reduction entered into by selector 22. Thus, if a speed reduction of "8" is selected, the imager will image scene 16 at a frame rate of 250 frames per second.

Sensors 18 and 18' are "block" readable area image sensors. The basic concept of a block readout of a solid state area image sensor is disclosed in U.S. Pat. No. 4,322,752 in the name of James A. Bixby which is incorporated herein by reference.

Figure 2:
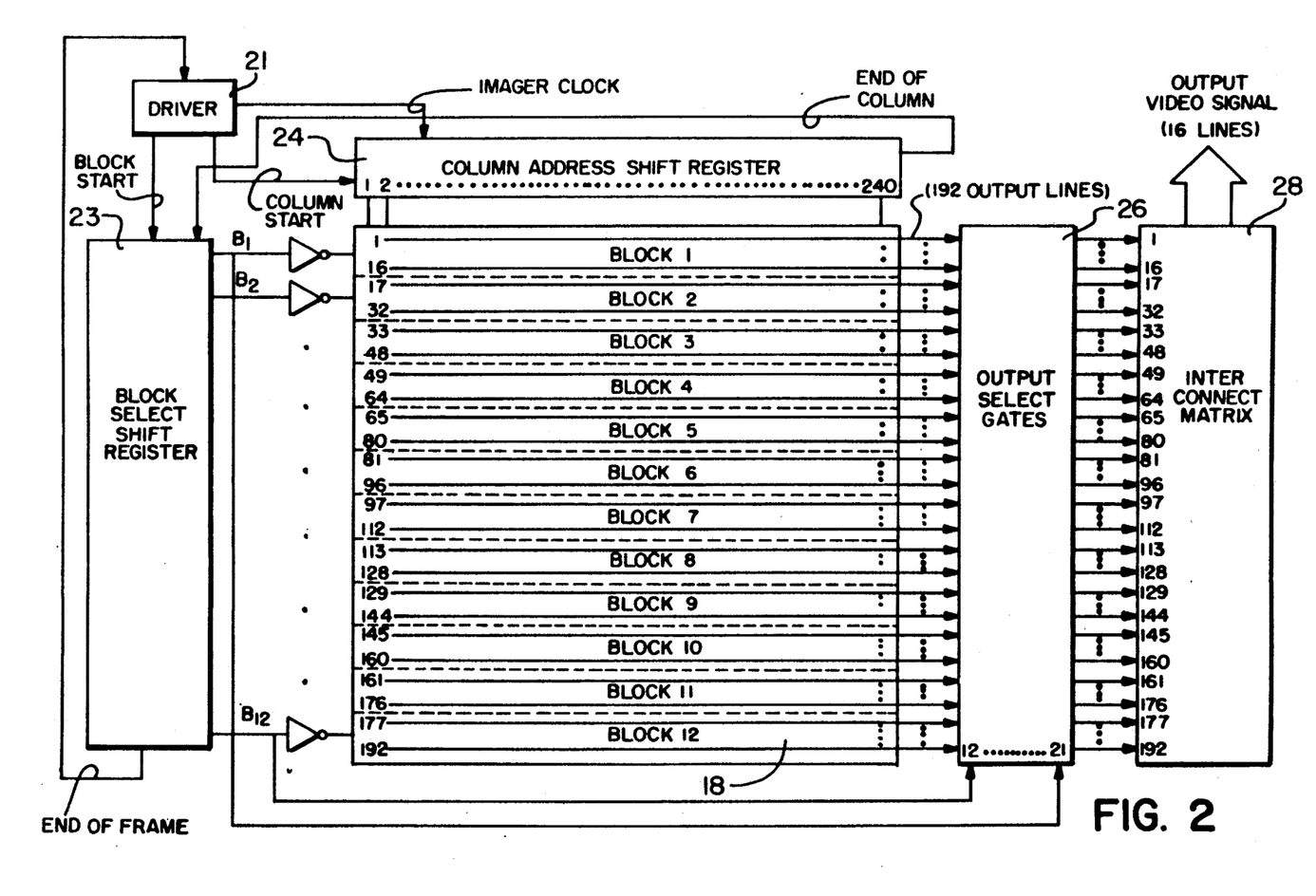
FIG. 2 is a functional block schematic diagram of a block readable area imager.
Figure 3:
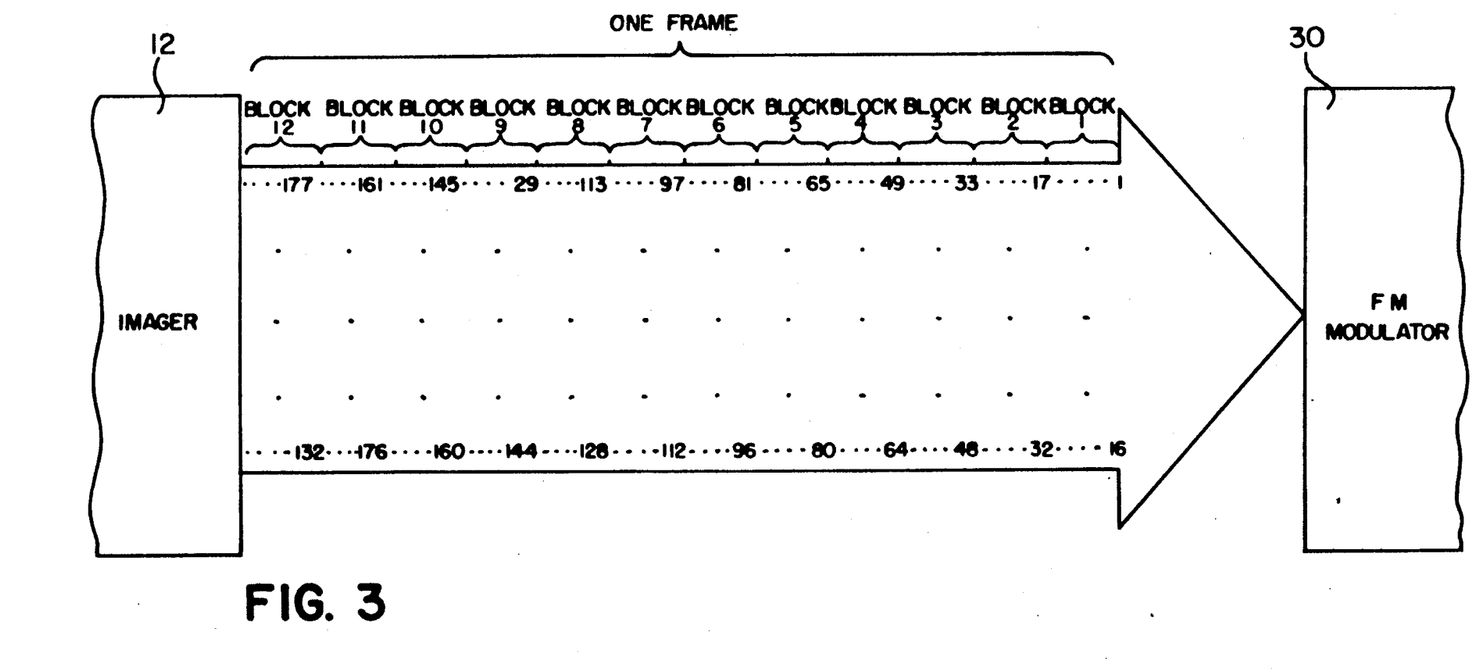
FIG. 3 is a diagrammatic view depicting the format of a video signal produced by block readout of an area image sensor.

The basic concept of block readout is illustrated in FIGS. 2 and 3. FIG. 2 shows a block readable sensor 18 (or 18') that includes an array of photosites (not shown individually) arranged in 192 rows and 240 columns.

For purposes of readout, sensor 18 (18') is formatted into 12 blocks of 16 photosite rows each. Although demarcation between blocks is indicated by dashed lines, it will be understood that no physical demarcation on the sensor itself is necessary. Each information is produced in series and each block of information contains 16 row signals arranged in parallel. A result of such a readout technique is a reduction of the time required for sensor readouts by a factor of 16 (i.e. the number of photosite rows in a block).

As shown in FIG. 3, the video signal resulting from block readout of a single frame is comprised of a serial train of block information wherein each block is comprised of 16 lines of video information that correspond to the 16 rows of photosites within each block. Each individual line of video information is an analog signal varying in level proportionate to the level of scene illuminance, and each line contains 240 picture elements (pixels) that correspond respectively to the 240 photosites in each row of photosites.

As shown in FIG. 3, each channel of information includes the video information of every 16th line of image sensor 18. Thus, the first video information channel includes lines 1, 17, 33, 49, 65, 81, 97, 113, 129, 145, 161, and 177, and the last video information channel includes lines 16, 32, 48, 64, 80, 96, 112, 128, 144, 160, 176, and 192.

Referring again to FIG. 1, the sixteen lines of signals from each of imagers 12 and 12' are processed in imager interface circuit 29 in accordance with image format signals received from system control unit (SCU) 31. As will be described in more detail below, interface circuit 29 selectively processes the block signals from imagers 12 and 12' to produce an output of 16 lines of video signals. Each of the 16 line signals that constitutes the analog video signal from circuit 29 photosite is readable upon the application thereto of an enablement signal and an address signal. To begin readout, a driver 21 produces a BLOCK START signal that causes a block select shift register 23 to produce an enablement signal that enables (via block enable line $B_1$) all photosite rows within block 1, i.e. rows 1-16. In response to a COLUMN START signal from the driver 21 column address electronics in the form of a shift register 24 sequentially addresses the 240 photosite columns of the entire area image sensor 18. Because the photosite rows within blocks 2-12 (rows 17-192) are not enabled, only photosite rows 1-16 (block 1) are read out at this time. The remaining photosites in the not-enabled blocks continue to integrate charge in response to incident radiation from scene 16. After all columns have been addressed an END OF COLUMN signal sequences the block select shift register 23 to enable via block enable line $B_2$, the block 2 photosite rows, i.e., rows 17-32. Column-wise readout then proceeds as described above for the block 1 photosite rows. This process is repeated until all 12 blocks of photosite rows are read out at which time END OF FRAME signal from block select shift register 23 resets driver 21 for readout of the next frame.

Output select gates 26 and an interconnect matrix 28 of conductive bus lines perform the function of a block multiplexer that causes only signals from the 16 photosite rows within the block that is being read out to appear as an output signal. Reference is made to U.S. Pat. No. 4,322,752 for a more detailed discussion of the construction of output select gates 26 and matrix 28.

As a result of such read out, block is frequency modulated in an FM modulator circuit 30 on a carrier.

The frequency modulated video signals undergo a divide-by-N process in a divide-by-N circuit 32. A suitable divide-by-N circuit which may be adapted to the apparatus shown in FIG. 1 is illustrated in FIG. 7 of commonly-assigned U.S. Pat. No. 4,496,995 issued Jan. 29, 1985, by J. H. Colles et al. The value of "N" is equal (to the nearest integer) to the maximum selectable speed reduction divided by the selected speed reduction.

A timing signal from timing circuit 20 is also applied to circuit 32 to be divided by the same factor "N" as the FM video signals.

The output of the divide-by-N circuit 32 includes seventeen frequency divided frequency modulated signals. These signals are applied to a recording head driver circuit 34 that drives an 18 channel magnetic recording head 36. Channel 18 of the recording head is used for recording digital data. The digital data is produced by a data source 38 which produces digital data signals which are processed by data record processing circuit 40. Source 38 also provides data clock signals which are in synchronism with the digital data signals to data recording processing circuit 40. The processed data signal is supplied to recording head driver 34 and then to the magnetic recording head for track 18 in multihead 36.

The 18 signals are recorded along 18 separate channels or tracks on magnetic tape 38. Magnetic tape 38 is provided in a cassette (not shown) having supply reel 40, takeup reel 42, and tape guides 44 and 46. When the tape cassette is inserted into apparatus 10, tape 38 is pressed against recording head 36 and reproducing head 48 as well as external guides 50, 52, and 54. Tape is advanced from reel 40 to reel 42 by means of capstans 56 and 58 respectively driven by capstan motors 60 and 62, controlled by motor drive 64.

The speed at which magnetic tape 38 is advanced during recording is selected to be proportional to the selected speed reduction and frame rate of recording. For example, if a record frame rate of 250 frames per second is chosen with a speed reduction of 8, then the magnetic tape 38 would be advanced at a speed of 62½ inches per second.

Figure 4:
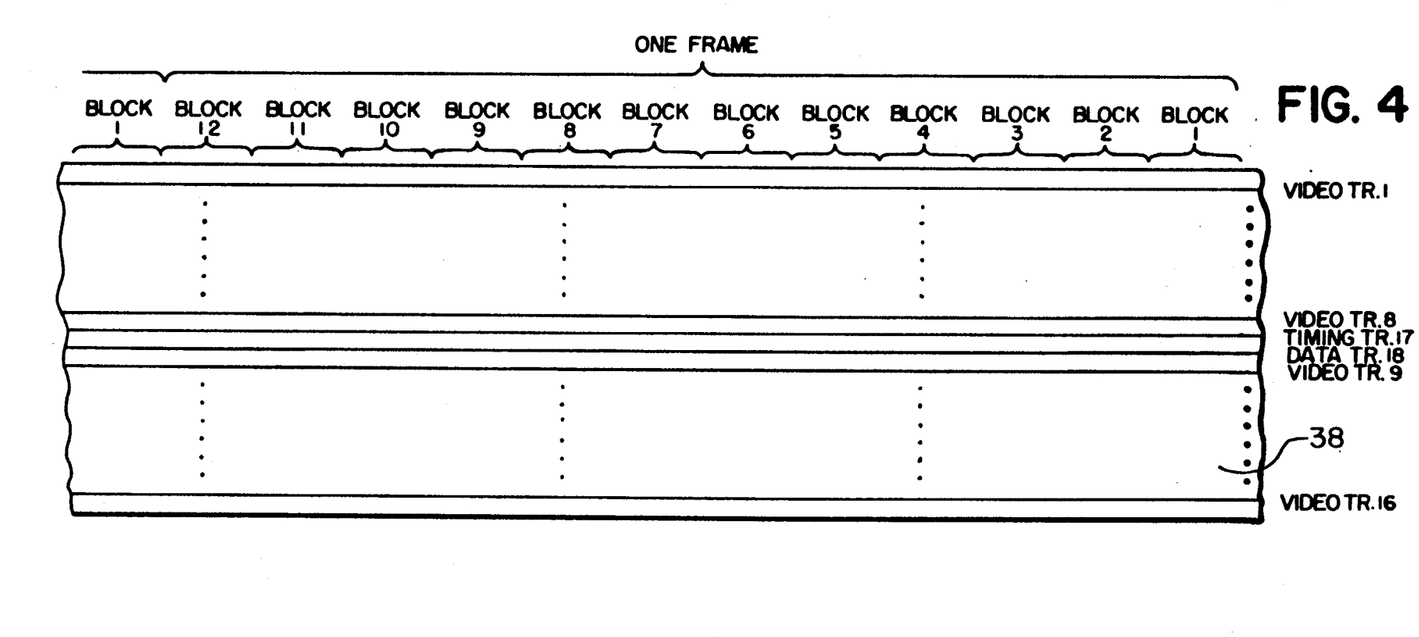
FIG. 4 is a diagrammatic view showing the multitrack format of video information recorded longitudinally in magnetic tape.

Upon recording, the signals retain the block format (as shown in FIG. 4) in which a timing track 17 and a data track 18 are located between video tracks 1-8 and video tracks 9-16.

Having recorded information on magnetic tape 38 that corresponds to a scene including an object under study, a slow motion video display of such scene is produced by playing back the recorded information at a constant tape speed of say, 7½ inches per second irrespective of the originally selected recording tape speed. As a result, the ratio of the recording tape speed to the playback tape speed yields a tape speed reduction ratio that equals the selected speed reduction.

Referring again to FIG. 1, the sixteen video signals produced by playback head 48 undergo signal processing in a preamplification and equalization circuit 64. The processed signals are then demodulated in an FM demodulator 66. After demodulation, the video signals (which are still in the block format shown in FIG. 3) are converted to a line sequential video signal by a video processing circuit 68.

A timing signal reproduced from timing track 17 is processed by circuit 64 and is applied to timing signal processing circuit 70 which extracts suitable timing and sync signals which are used in video processing circuit 68 to produce a signal to be displayed on monitor 72. The displayed scene information consists of a slow motion replay of the originally recorded scene at the selected speed reduction.

Data from data track 18 is reproduced by reproducing head 48 and preamplified and equalized in circuit 64. The data signal is then processed by data playback processing circuit 74 to be shown in window areas such as 76, 78 in a data frame 80 surrounding the main image area 82 of monitor 72.

According to the present invention, for applications requiring faster frame rates than the whole frame rate, a partial frame (split frame) mode of operation is provided that enables scene information to be recorded at a partial frame rate equal to 2, 3 or 6 times the whole frame rate. Playback scene information is displayed on a video monitor in either of one of two modes. In a first playback mode, the partial frames recorded in a whole frame period are simultaneously displayed side by side on the display monitor. In a second playback mode, each partial frame is displayed separately such that the partial frames recorded in a whole frame period are displayed sequentially. Reference is made to U.S. Pat. No. 4,339,775, issued Jul. 13, 1982, Inventors Lemke et al, for a detailed description of structure and operation of a fast frame recorder which is read out in block format in a partial frame mode. Fast frame recorder 10 is operable in four partial frame modes (referred hereinafter as 1X, 2X, 3X and 4X). The 1X mode corresponds to whole frame operation as described above. In the 2X mode, 6 blocks (e.g. blocks 5, 6, 7, 8, 9 and 10) are read out of imager 18 twice per whole frame period (see FIG. 2). In the 3X mode, 4 blocks (e.g. blocks 5, 6, 7 and 8) are read out of imager 18 three times per frame, and in the 6X mode, 2 blocks (e.g. blocks 5 and 6) are read out 6 times per frame. In such manner, partial frame rates of 2, 3 or 6 times the selected whole frame rate are effected.

Figure 5:
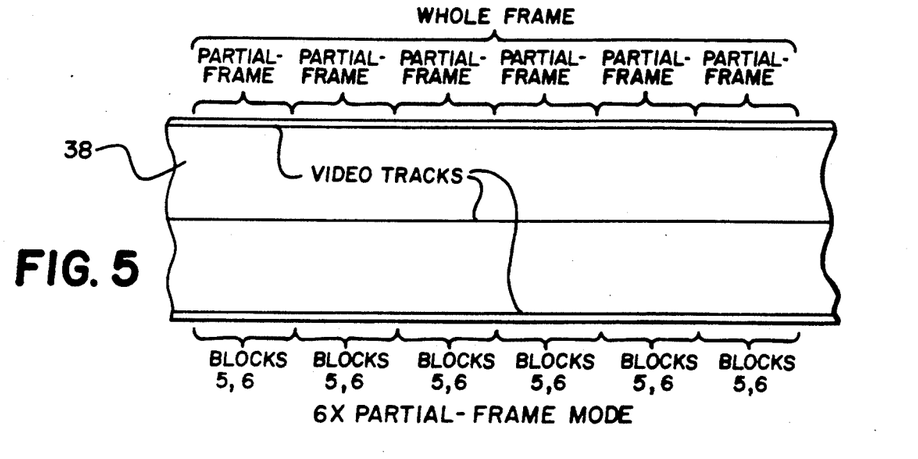
FIGS. 5, 6 and 7 are diagrammatic views respectively showing the format of signals recorded on magnetic tape in the 6X, 3X and 2X partial frame modes of operation.
Figure 6:
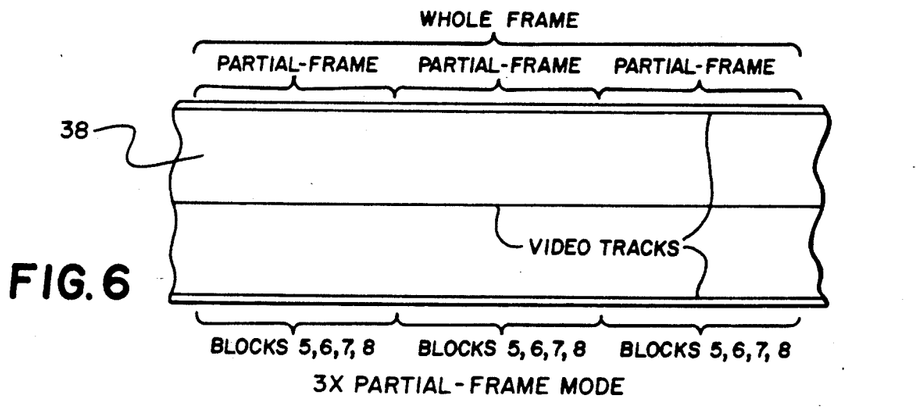
Figure 7:
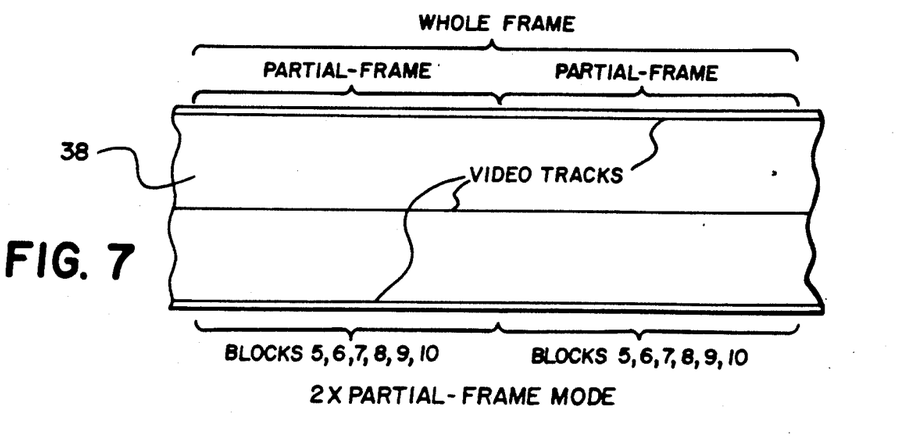

The corresponding formats of the signals produced by either camera 18 or 18' in the 2X, 3X and 6X partial frame modes of operation (as recorded on magnetic tape 38) are shown in FIGS. 5, 6 and 7, respectively. As shown in FIG. 5, 6 partial frames are recorded on tape 38 for each whole frame with each partial frame comprising blocks 5 and 6. In FIG. 6, 3 partial frames are recorded for each whole frame with each partial frame including blocks 5, 6, 7 and 8. In FIG. 7, 2 partial frames are recorded for each whole frame, with each partial frame including blocks 5, 6, 7, 8, 9 and 10.

Figure 10:
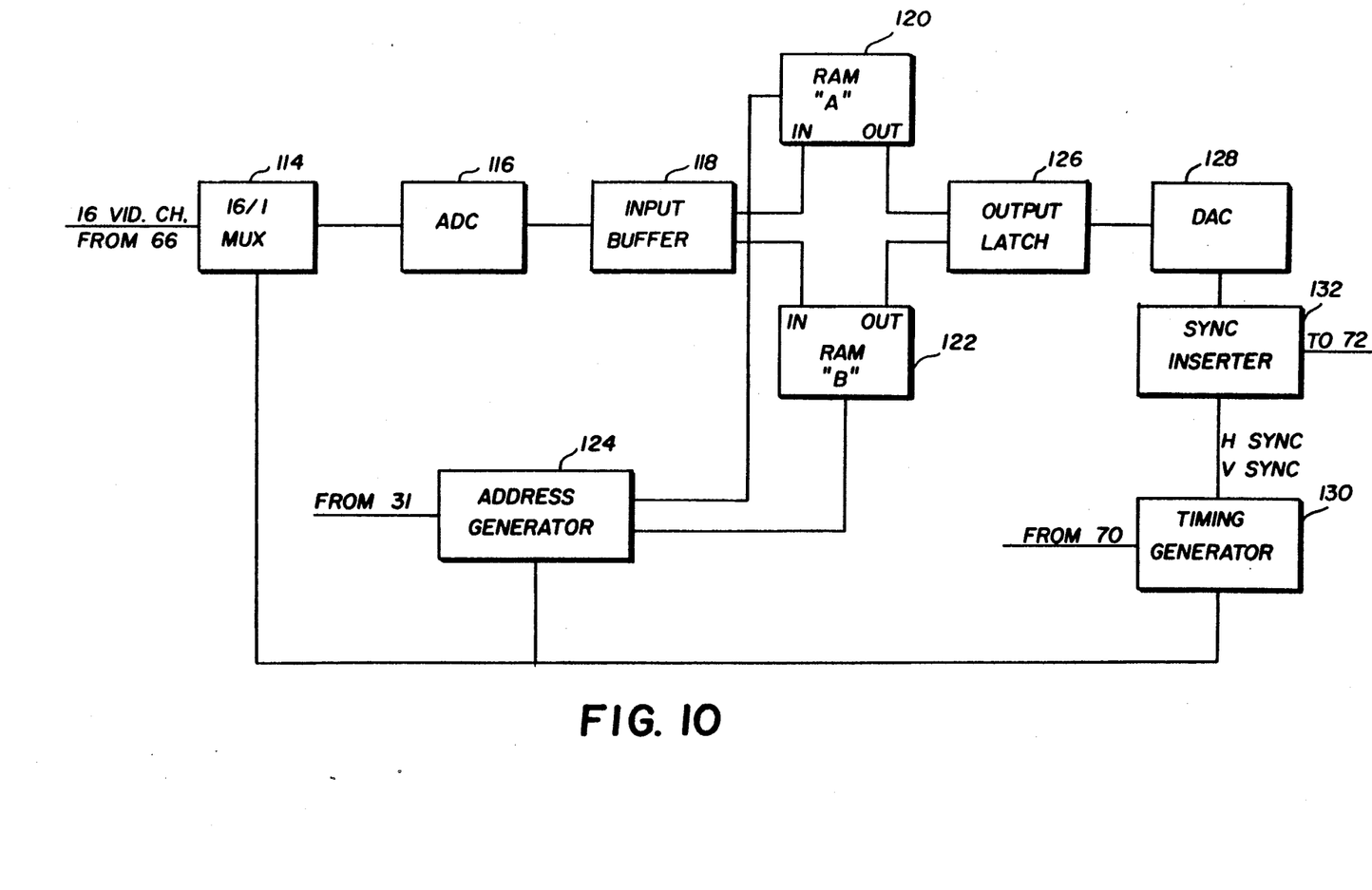
FIG. 10 is a block diagram showing in greater detail the video processing circuit of FIG. 1.

Referring now to FIG. 10, there will be described in greater detail video processing circuit 68 of FIG. 1. As described above, FM demodulator 66 produces 16 simultaneous channels or lines of video information which are supplied to video processing circuit 68. In order to display this video information on a standard video monitor, the simultaneous lines of video information must be converted into line sequential information. Video processing circuit 68 includes a 16:1 multiplexer (MUX) 114, analog to digital converter (ADC) 116, input buffer 118, random access memories (RAM) 120 and 122, address generator 124, output latch 126, digital to analog converter (DAC) 128, timing generator 130 and sync inserter circuit 132. Multiplexer 114 is controlled by a timing signal which is 16 times as fast as the signal rate of the 16 lines of video information derived from demodulator 66. Multiplexer 114 thus sequentially passes through the video information appearing on each of the 16 video input channels to the output line at a rate which is 16 times faster than the input rate. The multiplexer 114 thus samples all 16 input video lines before the pixel information corresponding to column 2 of a block appears on the input lines.

The output signal from multiplexer 114 is applied to ADC 116 which converts the analog pixel signal to a digital pixel signal which is loaded into input buffer 118. Address generator 124 receives signals from SCU 31 to generate sequential addresses for storing the digital information either in RAM 120 or RAM 122.

If the operator has selected playback mode, then as a frame is written into RAM 120, a frame is read out of RAM 122. During the next frame period, a frame of video information is written into RAM 122 and a frame of video information is read out from RAM 120. It will be appreciated that, whereas the pixels of video information written into either RAM 120 or RAM 122 is sequenced so that column 1 of lines 1-16 is followed by column 2 of lines 1-16 and so on to column 240 of lines 1-16, the pixels of video information are read out of RAMs 120, 122 in line sequential format so that, for example, line 1, columns 1-240 are read out first, then line 2, columns 1-240, etc.

The digital data read out of RAM 120 and RAM 122 is loaded into output latch 126 and converted into an analog video signal by DAC 128. Timing generator 130 produces H sync and V sync signals which are combined in sync inserter 132 with the analog video information from DAC 128 to produce line sequential video to be displayed on monitor 72.

According to the present invention, partial frames are displayed on monitor 72 either in a multiple split frame mode (in which all of the partial frames recorded during a whole frame time period are displayed simultaneously) or in a single split frame mode (in which the partial frames recorded during a whole frame period are displayed on monitor 72 in sequence). Selector 22 (FIG. 1) incorporates suitable controls which are actuated to effect the multiple or single split frame display mode.

Figure 8:
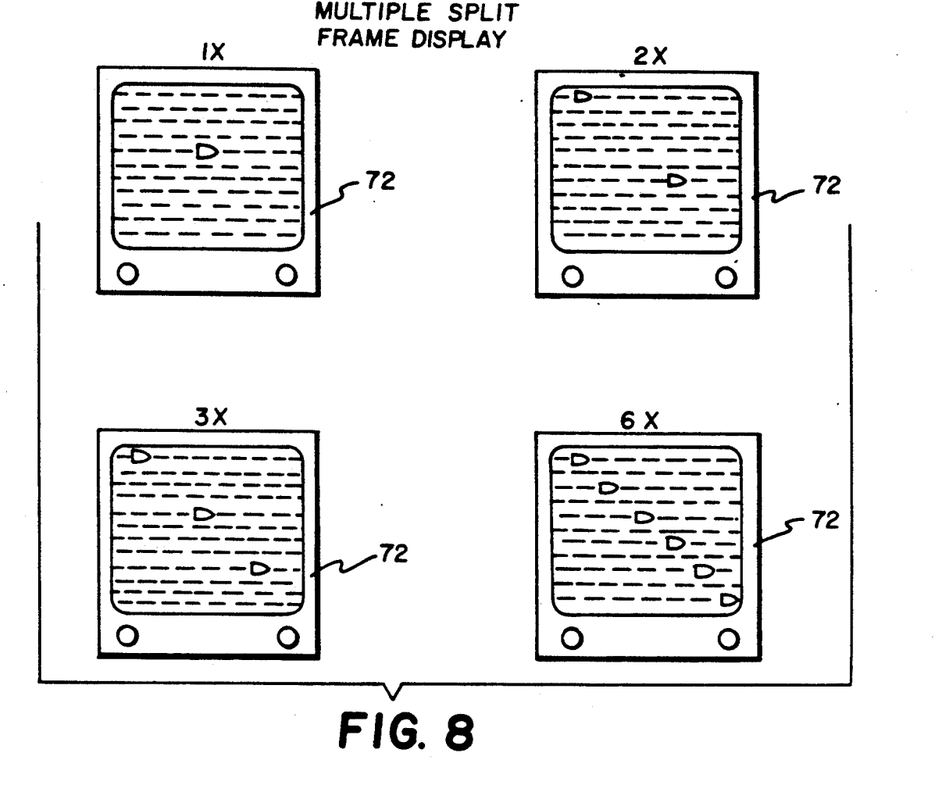
FIG. 8 includes several diagrammatic views showing video displays typical of the various partial frame modes of operation depicting multiple split frame display.

As shown in FIG. 8, when the multiple split frame display mode is chosen, all of the partial frames recorded in a whole frame period are displayed simultaneously. Thus, in the 1X mode or whole frame mode, a single frame is displayed. In the 2X partial frame mode, 2 partial frame images of the same scene are displayed simultaneously. In the 3X partial frame mode, 3 partial frame images of the same scene are displayed simultaneously, and in the 6X partial frame mode, 6 partial frame images of the same scene are displayed simultaneously.

Figure 9:
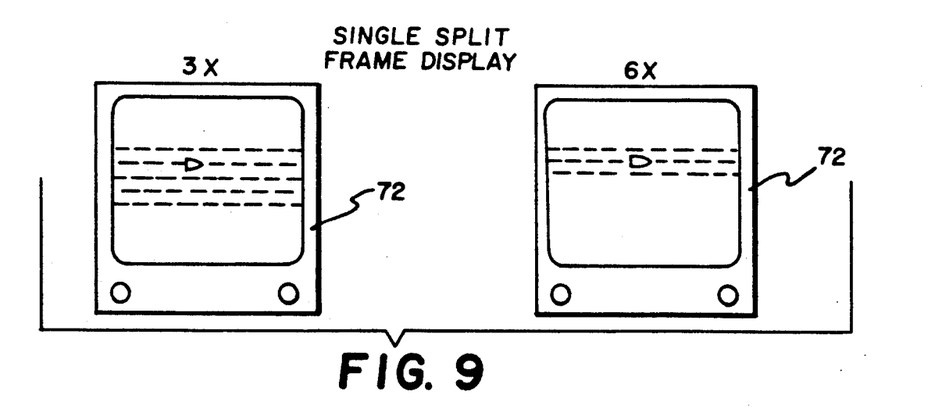
FIG. 9 is a pair of diagrammatic views showing video display of partial or split frames sequentially displayed in the 3X and 6X partial frame modes.

As shown in FIG. 9, the single split frame display mode is illustrated for operation of the fast frame recorder in the 3X or 6X partial frame modes. In the 3X single split frame mode, 3 partial frame images are displayed sequentially on monitor 72 during a whole frame period. In the 6X single split frame mode, 6 partial frame images are displayed sequentially on monitor 72.

The slow motion technique disclosed in U.S. Pat. No. 4,511,931, issued Apr. 16, 1985, Inventor Bixby, may be used to sequentially playback partial frames in the single split frame display mode. According to the technique disclosed in this patent, magnetic tape is periodically transported in accordance with either a forward or reverse transport cycle, during which, a partial frame of scene information is played back from the tape and stored in a frame storage device for repeated display on a video monitor. Transportation of the tape in accordance with successive forward transport cycles results in forward slow motion display of the scene information, while successive reverse transport cycles result in a reverse slow motion display of scene information. Reference is made to the above patent for a more detailed description of such a slow motion mode of operation.

The invention has been described in detail with particular reference to preferred embodiments thereof but it will be understood that variations and modifications can be effected within the spirit and scope of the invention.

What is claimed is:

1. Video reproduction apparatus comprising:

an imager including an array of photosites arranged in rows thereof;

means for reading out said array of photosites in blocks of photosites wherein a plurality of said blocks are each comprised of a respective plurality of photosite rows within each block to produce an output frame signal comprised of blocks of information in a serial format with each block of information being comprised of a plurality of parallel lines of video information that correspond to the photosite rows in each block;

means for selecting a number of said blocks of photosite rows of a frame signal for a readout as a partial frame wherein the total number of blocks in a frame signal divided by said selected number of blocks is an integer N;

means for producing successive pluralities of partial frames of information by reading out said selected number of blocks N times for each frame signal of said imager;

a video display;

control means for controlling said display to selectively operate in a first mode wherein said N partial frames of a frame signal are displayed simultaneously on said display and in a second mode wherein said N partial frames of a frame signal are displayed sequentially on said display such that only one of said partial frames is displayed on said video display at any time and each of said N partial frames are displayed consecutively.

2. The apparatus of claim 1 including magnetic tape record/reproduce means for sequentially recording and reproducing said partial frames of information longitudinally on magnetic tape; memory means for storing said partial frames of a frame signal reproduced from said magnetic tape; and wherein said control means includes means for selectively reading out said memory means in said first mode to simultaneously display on said display all of the partial frames of a frame signal and in said second mode to sequentially display on said display each partial frame of a frame signal.

3. The apparatus of claim 1 wherein said video display has a display region including partial display regions and wherein in said second mode said partial frames are sequentially displayed in the same partial display region of said display.

* * * * *